A. BULSKI.
HORSESHOE CALK.
APPLICATION FILED JUNE 25, 1921.

1,424,800.

Patented Aug. 8, 1922.

Inventor.
Andrew Bulski
by Heard Smith & Tennant.
Attys.

UNITED STATES PATENT OFFICE.

ANDREW BULSKI, OF NEWTON, MASSACHUSETTS, ASSIGNOR OF ONE-HALF TO PATRICK J. QUINN AND ONE-FOURTH TO STEPHEN SULLIVAN, BOTH OF NEWTON, MASSACHUSETTS.

HORSESHOE CALK.

1,424,800.  Specification of Letters Patent.  Patented Aug. 8, 1922.

Application filed June 25, 1921. Serial No. 480,272.

*To all whom it may concern:*

Be it known that I, ANDREW BULSKI, a citizen of the United States, and resident of Newton, county of Middlesex, State of Massachusetts, have invented an Improvement in Horseshoe Calks, of which the following description, in connection with the accompanying drawing, is a specification, like characters on the drawing representing like parts.

This invention relates to horseshoe calks and has for its object to provide an improved calk which may be quickly applied to a horseshoe, and which when so applied will be automatically locked to the horseshoe thus preventing it from becoming casually displaced.

I secure the object of my invention by providing the shank of the calk with a spring retaining device constructed to yield as the shank is inserted into the opening in the horseshoe, and the resiliency of which causes it to grip the walls of the opening thereby preventing the accidental displacement of the calk.

In the preferred embodiment of my invention such spring device is in the nature of a leaf-spring extending transversely and having a length slightly longer than the diameter of the shank so that when the calk is driven into the horseshoe the spring will be flexed. The resiliency of the spring causes the ends thereof to grip the walls of the opening and thus prevent the calk from being dislodged.

In order to give an understanding of the invention, I have illustrated in the drawings a selected embodiment thereof which will now be described after which the novel features will be pointed out in the appended claims.

Figure 1:
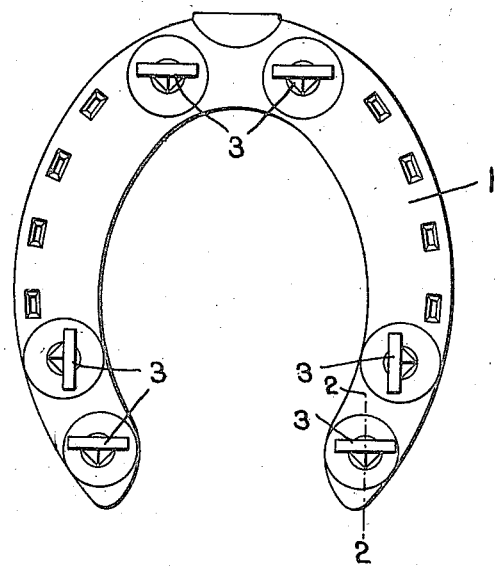
Figure 1 is a view of a horseshoe having calks applied thereto.

In the drawings 1 indicates a horseshoe which is provided with a plurality of openings 2 adapted to receive calks 3. Each calk is provided with a shank portion 4 constructed to be inserted into the opening 2; and in the construction herein shown both the opening 2 and shank 4 are tapered slightly, although this is not essential to the invention.

As stated above my invention comprises a spring retaining device secured to the shank 4 and adapted to flex as the shank is driven into the opening 2, said spring device operating to grip the walls of the opening and hold the calk in place. In the illustrated embodiment of my invention this spring retaining device is in the form of a leaf-spring 5 which extends transversely of the calk and which has a length sligthly greater than the diameter of the calk. I will preferably place this spring retainer at the inner end of the shank because of the convenience with which it may be attached to the shank in this position, but the particular location of the spring retainer is not essential to the invention.

As herein shown the end of the shank is provided with a transverse groove 6 in which the spring retainer 5 is received. The groove 6 is made deeper at the ends 7 than at the center thus providing a rounded bottom to the groove.

Figure 2:
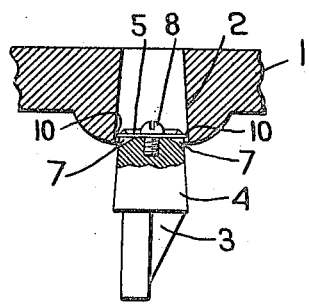
Fig. 2 is an enlarged section on the line 2—2, Fig. 1, showing a calk being inserted into the opening in the horseshoe.
Figure 3:
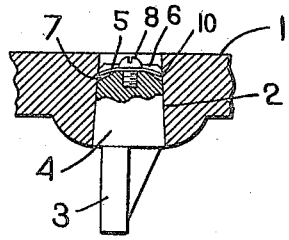
Fig. 3 is a similar view showing the calk fully inserted.
Figure 4:
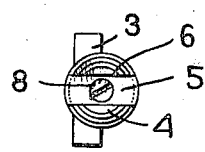
Fig. 4 is a top plan view of the calk.
Figure 5:
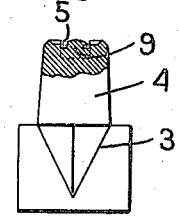
Fig. 5 shows a modification.

The spring may be secured to the shank in any suitable way. In Figs. 2, 3, and 4 I have shown a screw 8 for this purpose which extends through an aperture in the center of the spring retainer and screw-threads into the shank. In Fig. 5 the shank is provided with a projection 9 which extends through the opening in the spring 5 and which may be headed over to retain the spring in place. The spring 5 is slightly longer than the diameter of the shank at the point where the spring is attached so that the ends 10 of the spring normally extend beyond the walls of the shank.

When the shank is inserted into the aperture 2 the ends 10 of the spring will engage the walls of the aperture and the spring will flex as shown in Fig. 3, the shape of the groove at the ends 7 permitting such flexure of the spring. Since the spring flexes backwardly as the shank is inserted, the presence of the spring will not interfere at all with driving the calk into the opening 2. When the calk is firmly driven home the resiliency of the spring 5 causes the ends 10 thereof to engage and grip the walls of the opening 2, and as the ends 10 are in the form of knife edges they will provide a secure hold on the wall of the opening 2 which will prevent the calk from being removed. Any pressure on the calk tending to force it outwardly will only cause the knife edges to become embedded in the walls of the opening 2 thus securely locking the calk in place. This spring retainer 5 will hold the calk in place and prevent it from becoming dislodged during any ordinary use to which the horseshoe is put. When the calk becomes worn and needs to be replaced it can be forcibly removed from the shoe by means of suitable tools, but in so doing the spring 5 is likely to become broken. This, however, is of no moment because when the calk is worn out it is expected that it will be thrown away.

My improved calk will be firmly retained in the horseshoe and will not become dislodged during use.

It is inexpensive to manufacture and can be quickly inserted in place. In fact in inserting a calk in the horseshoe it is not necessary to drive the calk into place with the hammer, because if the calk is merely pressed into the opening as far as it will go, the spring 5 will prevent it from becoming dislodged, and as soon as the weight of the horse comes on the horseshoe the calk will be forced firmly into place.

I claim:

1. The combination with a horseshoe having an opening, of a calk having a shank to enter said opening, and a spring retaining device removably secured to the shank at the end thereof and extending transversely of the shank, said retaining device having a length slightly longer than the diameter of the shank, whereby said retaining device will flex as the shank is introduced into the opening and the resiliency of said retaining device will cause the ends thereof to grip the walls of the opening and thereby to prevent the shank from being dislodged.

2. The combination with a horseshoe having an opening, of a calk having a shank to enter said opening, and a spring retaining device extending transversely of the shank and having a length slightly longer than the diameter of the shank, whereby said retaining device will flex as the shank is introduced into the opening and the resiliency of said retaining device will cause the ends thereof to grip the walls of the opening and thereby to prevent the shank from being dislodged.

3. The combination with a horseshoe having an opening, of a calk having a shank to enter said opening, said shank being provided on its end with a transverse groove having a rounded bottom, and a spring retaining device in said groove and having a length slightly greater than the diameter of the shank, whereby when the shank is driven into the opening the spring will flex but the resiliency of the spring will cause the ends thereof to grip the walls of the opening and prevent the shank from being dislodged.

In testimony whereof, I have signed my name to this specification.

ANDREW BULSKI.